(12) United States Patent  
Kinasewich et al.

(10) Patent No.: US 8,182,678 B2  
(45) Date of Patent: May 22, 2012

(54) FLOW THROUGH WASTEWATER TREATMENT APPARATUS

(75) Inventors: Harold Kinasewich, Edmonton (CA); Kyle Greene, Edmonton (CA)

(73) Assignee: Seair Inc., Edmonton, Alberta (CA)

( * ) Notice: Subject to any disclaimer, the term of this patent is extended or adjusted under 35 U.S.C. 154(b) by 115 days.

(21) Appl. No.: 12/355,181

(22) Filed: Jan. 16, 2009

(65) Prior Publication Data

US 2009/0178967 A1    Jul. 16, 2009

Related U.S. Application Data

(60) Provisional application No. 61/021,500, filed on Jan. 16, 2008.

(51) Int. Cl.  
*C02F 1/78* (2006.01)

(52) U.S. Cl. ...... 210/192; 210/205; 210/220; 210/221.2; 210/259; 210/521; 261/77; 261/123; 261/124; 261/DIG. 42

(58) Field of Classification Search .......... 210/760, 210/192, 205, 209, 220, 221.1, 221.2, 257.1, 210/258, 259, 320, 521, 522; 261/76, 77, 261/119.1, 121.1, 123, 124, DIG. 42; 366/101, 366/107

See application file for complete search history.

(56) References Cited

U.S. PATENT DOCUMENTS

| | | | | |
|---|---|---|---|---|
| 3,482,694 A | * | 12/1969 | Rice et al. | 210/615 |
| 4,504,388 A | | 3/1985 | Desbos et al. | |
| 5,498,347 A | * | 3/1996 | Richard | 210/192 |
| 5,711,887 A | * | 1/1998 | Gastman et al. | 210/760 |
| 5,843,307 A | * | 12/1998 | Faivre et al. | 210/192 |
| 5,900,154 A | * | 5/1999 | Henriksen | 210/703 |
| 6,569,338 B1 | | 5/2003 | Ozyboyd | |
| 6,740,245 B2 | | 5/2004 | Johnson | |
| 6,869,540 B2 | | 3/2005 | Robinson et al. | |
| 6,923,901 B2 | | 8/2005 | Leffler et al. | |
| 7,137,620 B2 | | 11/2006 | Thomas et al. | |
| 7,273,562 B2 | | 9/2007 | Robinson et al. | |
| 7,381,338 B2 | | 6/2008 | Van Leeuwen et al. | |
| 7,402,253 B2 | | 7/2008 | Van Leeuwen et al. | |
| 2002/0117458 A1 | * | 8/2002 | Puetter et al. | 210/192 |
| 2004/0099607 A1 | | 5/2004 | Leffler et al. | |

FOREIGN PATENT DOCUMENTS

| | | |
|---|---|---|
| JP | 2000189981 | 7/2000 |
| KR | 6104476 A | 3/2005 |
| WO | 2005049502 | 2/2005 |
| WO | 2005061388 | 7/2005 |
| WO | 2008113150 | 9/2008 |

* cited by examiner

*Primary Examiner* — Joseph Drodge  
*Assistant Examiner* — Lucas Stelling  
(74) *Attorney, Agent, or Firm* — Davis & Bujold, P.L.L.C.

(57) ABSTRACT

An apparatus for treating liquid includes a tank having a water inlet for receiving water, a treated water outlet for outputting treated water and a flow path between the inlet and the outlet. An injection section of the tank is located along the flow path of the tank with an outlet toward a bottom of the tank. Ozonated liquid containing ozone microbubbles is injected through an injection manifold positioned within the injection section of the tank. The ozone microbubbles adsorb to impurities in the ozonated water. A separation section of the tank is positioned downstream of the outlet of the injection section. The separation section has a contact surface such that the ozonated water travels upward to contact the contact surface and such that at least a portion of the ozone microbubbles adsorb to the contact surface.

7 Claims, 2 Drawing Sheets

FLOW THROUGH WASTEWATER TREATMENT APPARATUS

FIELD

A flow through water treatment apparatus.

BACKGROUND

Ozone treatment of water has been commonly done in batches, such as in PCT application no. PCT/CA2007/000435.

SUMMARY

There is provided an apparatus for treating liquid, comprising a tank having a water inlet for receiving water to be treated and a treated water outlet for outputting treated water. The tank has a flow path between the water inlet and the treated water outlet. An injection section of the tank is located along the flow path of the tank, the injection section having an outlet toward a bottom of the tank. There is a source of ozonated liquid containing ozone microbubbles. An injection manifold is positioned within the injection section of the tank for injecting the ozonated liquid into the injection section of the tank to form an ozonated water. At least a portion of the ozone microbubbles adsorb to impurities in the ozonated water and creating a turbulent flow within the injection section of the tank. There is a separation section of the tank positioned downstream of the outlet of the injection section of the tank and upstream of the treated water outlet along the flow path. The separation section of the tank has a contact surface in a section of the flow path having an upward direction of travel such that the ozonated water travels upward to contact the contact surface and such that at least a portion of the ozone microbubbles adsorb to the contact surface.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
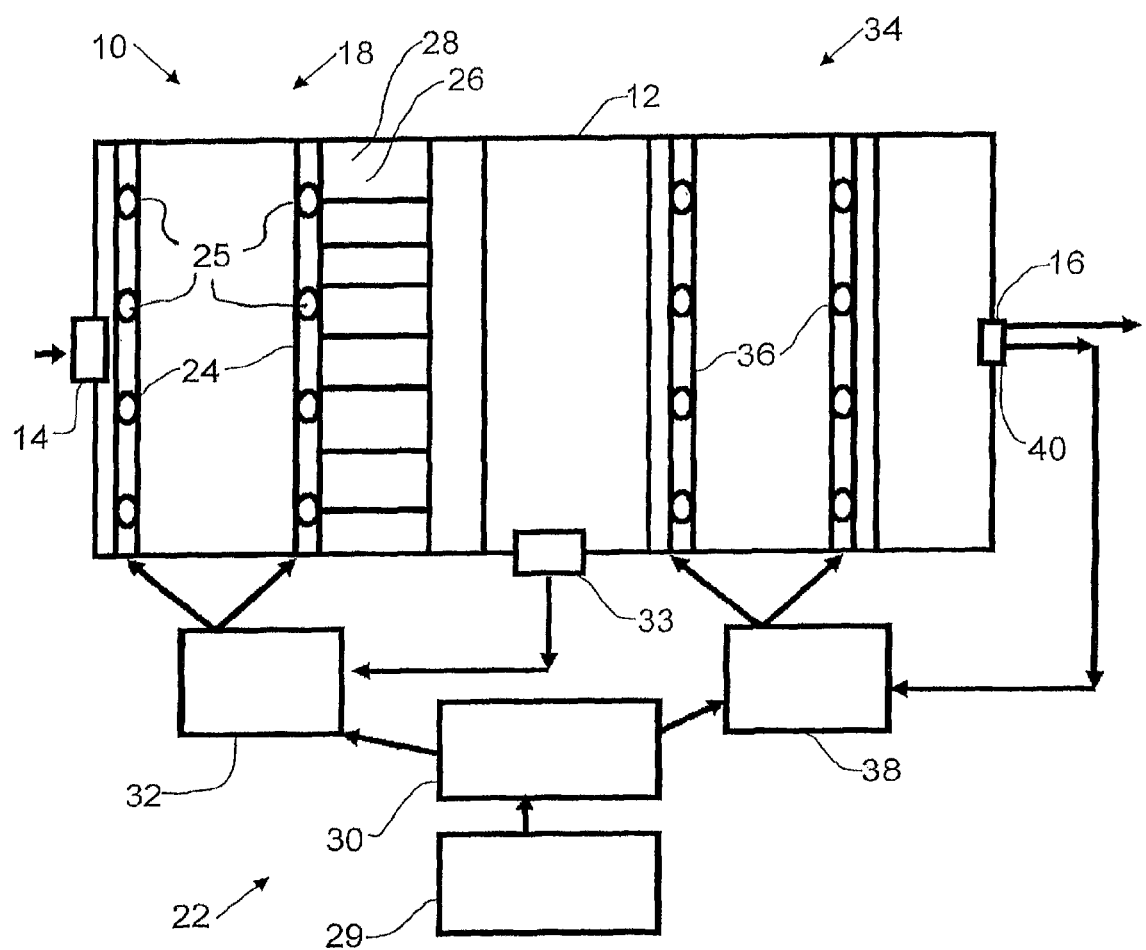
FIG. 1 is a top plan view of the water treatment apparatus.
Figure 2:
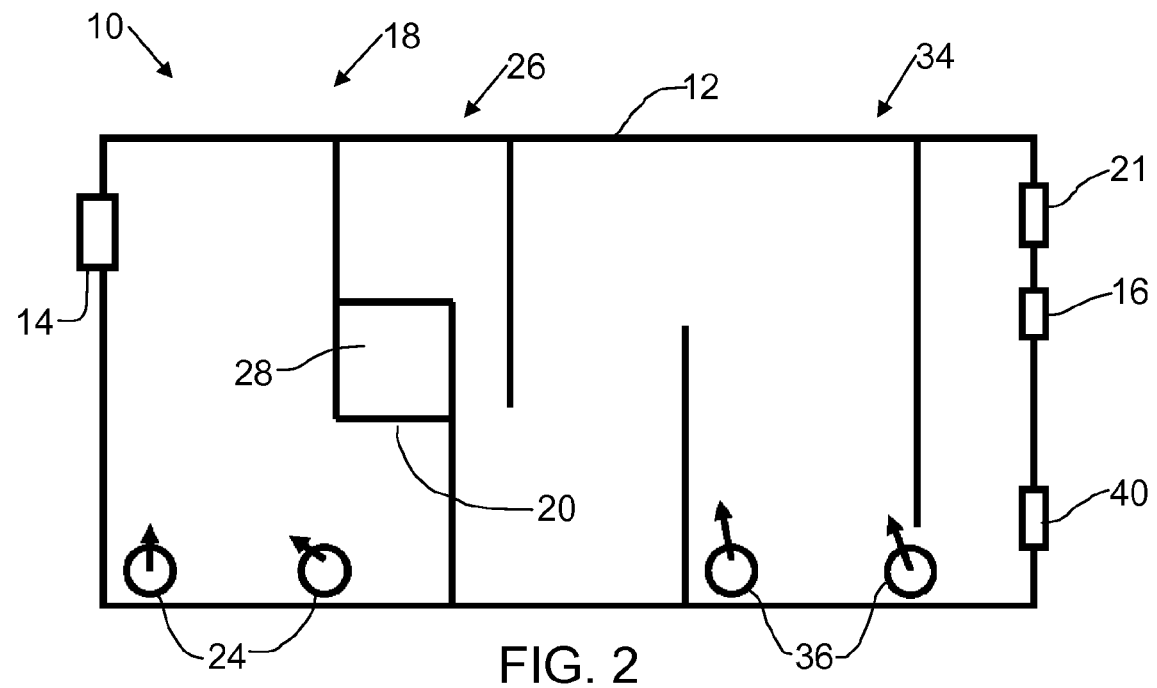
FIG. 2 is a side plan view of the water treatment apparatus.
Figure 3:
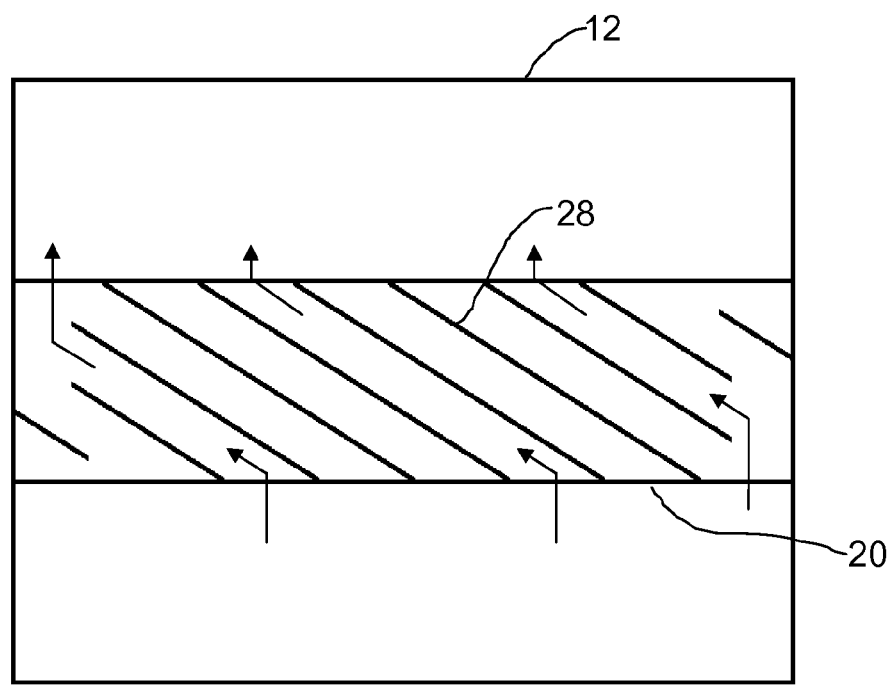
FIG. 3 is an end elevation view in section of the water treatment apparatus.

A water treatment apparatus generally identified by reference numeral 10, will now be described with reference to FIG. 1 through 3.
Structure and Relationship of Parts:

Referring to FIGS. 1 and 2, apparatus 10 has a tank 12 with a water inlet 14 for receiving water to be treated and a treated water outlet 16 for outputting treated water. Inlet 14 and outlet 16 are connected by a flow path through tank 10. Tank 12 has an injection section indicated generally by reference numeral 18. As shown, injection section 18 has water inlet 14 as an inlet and has an outlet 20 toward a bottom of tank 12 as shown in FIG. 2. It will be understood, however, that injection section 18 may not be immediately adjacent to inlet 14. Referring to FIG. 2, there may also be one or more vents 21. Water to be treated may include residential wastewater, industrial wastewater, potable water, production water, or the like.

Referring to FIG. 1, there is a source of ozonated liquid generally indicated by reference numeral 22, the ozonated liquid containing ozone microbubbles. The ozonated liquid is injected through an injection manifold 24 that is positioned within injection section 18 of tank 10. The injection manifold 24 is preferably a jet injection manifold having a longitudinal axis with a series of jets 25 spaced at intervals along the longitudinal axis and aimed radially from the longitudinal axis that creates a turbulent flow within injection section 18, and also causes a further mechanical breakdown of the solids in the water to be treated. Preferably, referring to FIG. 2, the turbulent flow creates a rolling current or circular flow, with ozonated water escaping from injection section 18 through outlet 20. During the turbulent flow, the ozonated liquid mixes with the water to be treated to form an ozonated water, such that some or all of the ozone microbubbles then adsorb to impurities in the ozonated water and creating a turbulent flow within the injection section of the tank.

Once the ozonated water passes through outlet 20, it enters a separation section of tank 10, indicated generally by reference numeral 26, and is positioned along the flow path, downstream of outlet 20 of injection section 18 and upstream of treated water outlet 16. Separation section 26 of tank 10 has a contact surface 28, such as a series of angled baffles spanning between barrier walls and positioned immediately downstream of the injection section of the tank such that the flow path of the water to be treated must pass through and must be diverted by the angled baffles when flowing from the injection section to the separation section, each baffle defining a contact surface positioned at an acute angle in relation to the bottom the tank as shown in FIGS. 2 and 3, in a section of the flow path having an upward direction of travel such that the ozonated water travels upward to contact the angled separation baffles and such that at least a portion of the ozone microbubbles adsorb to the angled baffles.

Referring to FIG. 1, the source of ozonated liquid comprises an oxygen generator 29 that feeds an ozone generator 30 and a diffusion chamber 32. As depicted, diffusion chamber 32 draws water from tank 12 at a point 33 downstream of injection section 18 to create the ozonated liquid. It is preferred to have the water that is ozonated and injected into tank 12 to come from tank 12 such that this does not change the liquid level.

As depicted, there may be an additional injection section 34 downstream of separation section 18. Additional injection section 34 has an additional injection manifold 36, such as a jet manifold, for injecting ozonated liquid into additional injection section 36 of tank 12. Instead of producing a rolling current, additional injection manifold 36 may be directed back along the flow path, such that the fluid expulsed by the jets in manifold 36 tends to push the fluid back. As this will be more effective against heavier substances, contaminated water is held back, while clean water is more likely to pass through additional injection section 34 to treated water outlet 16. While not shown, an additional separation section may also be included if desired.

In the embodiment shown in FIG. 1, first injection section 18 and separation section 26 may be sufficient to provide primary and secondary treatment to the water to remove of solids and impurities, while the additional injection system may provide tertiary treatment to sanitize the water. As shown, the ozonated liquid is injected from an additional diffusion chamber 38, where additional diffusion chamber 38 draws water from tank 12 at a point 40 downstream of additional injection section 34 of tank 12 to create the ozonated liquid. An additional separation section (not shown) may also be included to remove ozone from the treated water prior to passing to the outlet, however it may not be needed or desired in all circumstances. For example, if all solid contaminants are removed in injection section 18 and separation section 26, the problem of solids becoming buoyant due to adsorbed ozone microbubbles is not present.

In one embodiment, apparatus 10 may be used to treat water that is already relatively clean. For example, it may be used to apply a tertiary treatment to potable water that does not require primary or secondary treatment. In this embodiment, it only be necessary to use one injection section, with the manifold creating the desired flow current to enhance the treatment.

Operation:

Referring to FIGS. 1 and 2, tank 12 is intended to treat water as a flow through unit, rather than a batch treatment unit. Water to be treated is input into tank 12 and in particular, injection section 18, through input 14. In injection section 18, the water to be treated is mixed with ozonated liquid that is injected into injecting section 18 via jet manifold 24. Ozonated liquid originates from liquid that is drawn from point 33, and passed through a diffusion chamber 32, which is fed with ozone from ozone generator 30, to introduce ozone microbubbles into the liquid. The ozone microbubbles adsorb to impurities in the water once injected into injection section 18. In addition to injection ozonated liquid, jet manifold 24 also creates a flow current, preferably in the form of a circular turbulent flow, which aids in the breaking up of solids present in the water, and prevents impurities with adsorbed ozone microbubbles from floating to the top of injection section 18. From injection section 18, the ozonated water passes through separation section 26 of tank 12, which attempts to separate ozone gas and solids from water. Separation section 26 contains a contact surface 28, preferably in the form of angled baffles as shown in FIG. 3, as the baffles increase the length of the flow path in tank 12 and also the surface area of contact surface 28. As the ozonated water contacts contact surface 28, the ozone microbubbles adsorb to this surface. As more microbubbles accumulate, the bubbles become large enough to overcome the force of the adsorption, and float toward the top of tank 12, and ultimately out vent 21 shown in FIG. 2. As this occurs, any solids that are present fall out of the water and are picked up by the current created by jet manifold 24 to continue treatment and breakdown.

Referring to FIG. 1, if additional injection section 34 is used, the water passes from separation section 26 into additional injection section 34, where it is again mixed with ozonated liquid. In the preferred embodiment where the first injection section 18 and separation section 26 are sufficient to provide primary and secondary treatment, the purpose of injection section 34 is to provide tertiary treatment. Injection jet manifold 36 is oriented to provide back pressure against the flow path of the water, which helps to keep back heavier, contaminated fluids, while allowing the cleaner fluids to pass through.

Advantages:

As ozone adsorbs to impurities, it tends to cause the impurities to become buoyant and float toward the top of the tank. By inducing a rolling current in the first injection section, this effect is reduced. The angled baffles then allow the microbubbles to be removed from the water by having them adsorb to the baffles. As more microbubbles adsorb, larger bubbles form which tend to drop the solids they are attached to, and float to the top of the tank.

In one embodiment, the water treatment apparatus 10 may be used to treat household waste.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An apparatus for treating liquid, comprising:
   a tank having a water inlet for receiving water to be treated and a treated water outlet for outputting treated water, the tank having a flow path between the water inlet and the treated water outlet;
   an injection section of the tank along the flow path of the tank, the injection section having an outlet toward a bottom of the tank;
   a source of ozonated liquid containing ozone microbubbles;
   an injection manifold positioned within the injection section of the tank, the injection manifold having a longitudinal axis with a plurality of fluid injection jets spaced at intervals along the longitudinal axis and aimed radially from the longitudinal axis for creating a turbulent flow, the jets injecting the ozonated liquid into the injection section of the tank to form an ozonated water, and at least a portion of the ozone microbubbles absorbing impurities in the ozonated water; and
   a separation section of the tank positioned downstream of the outlet of the injection section of the tank and upstream of the treated water outlet along the flow path;
   a series of angled baffles spanning between barrier walls and positioned within the separation section of the tank such that the flow path of the water to be treated must pass through and must be diverted by the angled baffles when flowing from the injection section to the separation section, each baffle defining a contact surface positioned at an acute angle in relation to the bottom of the tank in a section of the flow path having an upward direction of travel such that the ozonated water travels upward to contact the contact surface and such that at least a portion of the ozone microbubbles absorb to the contact surface terminating gas floatation of impurities such that impurities fall toward the bottom of the tank and back into the turbulent flow.

2. The apparatus of claim 1, wherein the jets of the jet injection manifold create a circular turbulent flow within the injection section.

3. The apparatus of claim 1, wherein the source of ozonated liquid comprises an ozone generator and a diffusion chamber, the diffusion chamber drawing water from the tank downstream of the injection section of the tank to create the ozonated liquid which is fed to the injection manifold to define a first ozone circulation loop.

4. The apparatus of claim 3, the tank further comprising an additional injection section of the tank downstream of the separation section of the tank, and the additional injection section comprising an additional injection manifold for injecting ozonated liquid into the additional injection section of the tank.

5. The apparatus of claim 4, wherein an additional diffusion chamber is provided, the additional diffusion chamber drawing water from the tank downstream of the additional injection section of the tank and adding ozone from an ozone generator to create an additional ozonated liquid which is fed to the additional injection manifold to define an additional ozone circulation loop which is separate and distinct from the first ozone circulation loop.

6. The apparatus of claim 4, wherein the additional injection manifold is a jet injection manifold.

7. The apparatus of claim 6, wherein the additional jet injection manifold is directed back along the flow path through the additional injection section to provide a back pressure against flow.

* * * * *

UNITED STATES PATENT AND TRADEMARK OFFICE
CERTIFICATE OF CORRECTION

| | | |
|---|---|---|
| PATENT NO. | : 8,182,678 B2 | Page 1 of 1 |
| APPLICATION NO. | : 12/355181 | |
| DATED | : May 22, 2012 | |
| INVENTOR(S) | : Harold Kinasewich and Kyle Greene | |

It is certified that error appears in the above-identified patent and that said Letters Patent is hereby corrected as shown below:

In the Claims:

Column 4, line 37 (Claim 1, line 18) should read "adsorbing" instead of "absorbing".

Column 4, line 52 (Claim 1, line 33) should read "adsorb" instead of "absorb".

Signed and Sealed this
Fourth Day of February, 2014

Michelle K. Lee
*Deputy Director of the United States Patent and Trademark Office*